Oct. 3, 1961 W. V. TYRLICK 3,003,144
CONVERTER DEVICE
Filed June 4, 1959
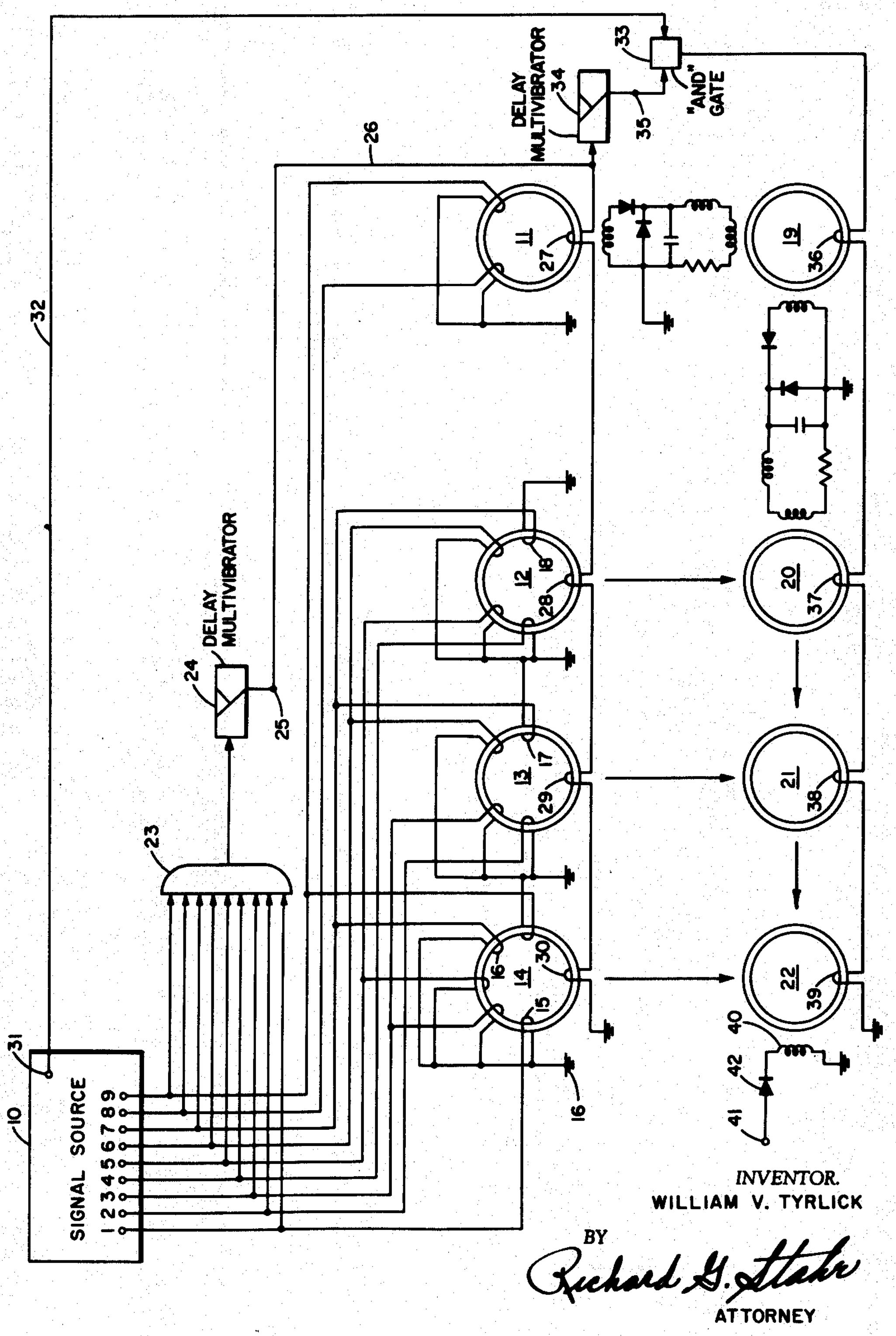
INVENTOR.
WILLIAM V. TYRLICK
BY Richard G. Stahr
ATTORNEY 3,003,144
Patented Oct. 3, 1961

3,003,144

CONVERTER DEVICE

William V. Tyrlick, Rochester, N.Y., assignor to General Dynamics Corporation, Rochester, N.Y., a corporation of Delaware Filed June 4, 1959, Ser. No. 818,138
3 Claims. (Cl. 340—347)

This invention relates to converter devices and, more specifically, to converter devices for converting signal pulse representations of characters into serial binary code representations of characters.

With equipment which utilizes binary code representations of characters, such as numerical digits and letters of the alphabet, it is necessary to decode the binary code representations for conversion to decimal numerals or Arabic letters. Decoder devices of this type are generally arranged to have an output terminal corresponding to each character to be decoded upon which an output signal pulse appears when the character to which it has been selected to correspond is decoded. These individual output signal pulses may be used in a variety of ways, the most common probably being to operate the keys of an electric typewriter so that the information emanating from the equipment is reduced to a more readable form.

However, during the decoding process, the binary code representations may be destroyed. As it is frequently desirable to preserve the binary code for further use, it is necessary to provide a converter device which will serve to convert the signal pulse character representations back into the proper binary code representations thereof.

As the use of equipment which is designed to operate with binary code representations is becoming increasingly popular, the requirement for a converter device of this type which is economical in construction and reliable in operation is apparent.

It is, therefore, an object of this invention to provide an improved converter device.

It is another object of this invention to provide an improved converter device of the type which converts signal pulse representations of characters into binary code representations of characters.

In accordance with this invention, there is provided a first group of binary elements, each of which has two stable states, either of which may be selected to represent either polarity bit of a binary code, wherein each one of these elements corresponds to a respective bit position within a binary code group. Each individual output terminal of a signal source which produces a signal pulse for each character is coupled with those binary elements which correspond to the bit positions occupied by the same polarity bits within the binary code group representation of the character to which the respective output terminal corresponds in a polarity sense for producing therein the stable state selected to represent that polarity bit when energized by the signal pulses. The information thus stored is transferred in parallel to a second group of binary elements which is arranged in such a manner that the information contained in any one may be transferred to the next succeeding element. Upon the application of a series of shift pulses to the second group of elements, the binary code representation may be taken therefrom in serial form.

For a better understanding of the present invention, together with further objects, advantages and features thereof, reference is made to the following description and accompanying single figure drawing.

While it is to be specifically understood that the novel converter device of this invention may be used with any decoder device which produces signal pulse representations of characters upon individual output circuits corresponding to the several characters, in the interest of reducing complexity of the specification and drawing, the operation of this novel device will be explained on the basis of converting signal pulse representations of numerical digits into binary coded decimal representations of numerical digits.

For proper operation, the novel device of this invention should be used with a signal source of the type which has an individual output terminal corresponding to each character represented, in each of which the appearance of a signal pulse denotes the character to which it corresponds. Signal sources of this type are conventional in design and are generally known as "decoders." As the details of this signal source are well known in the art and form no part of this invention, it has herein been illustrated in block form by reference numeral 10. It may be noted that signal source 10 is provided with nine output terminals indicated by reference numerals 1 through 9, inclusive, and that, since the binary code representation of the numerical digit 0 is all "space" polarity bits, no output terminal is necessary therefor. Signal source 10 may be a decoder device of the type which, upon the receipt of the binary code representation of any numerical digit, will produce a signal pulse upon the output terminal selected to correspond to that digit. That is, upon the receipt and decoding of the binary code representation of the decimal digit 1, signal source 10 will produce a signal pulse upon output terminal 1 or, upon the receipt and decoding of the binary code representation of the decimal digit 2, a signal pulse will be produced upon output terminal 2, and so on.

A first group of binary elements of the type which has two stable states, generally referred to as the "1" and the "0" stable states, is provided and each one corresponds to a respective bit position within a binary code group. As the binary coded decimal code for the numerical digits 0 through 9, inclusive, is a four-bit-per-group code, four binary elements, indicated by reference numerals 11, 12, 13 and 14, are required. While these binary elements have been herein illustrated as magnetic cores of the type composed of a magnetic material possessing relatively square hysteresis loop characteristics, it is to be specifically understood that any binary device having two stable states may be substituted therefor. Similarly, these magnetic cores have herein been indicated as being toroidal in form; however, any shape of magnetic core will be satisfactory. Although either of the stable states of the magnetic cores 11 through 14, inclusive, may be selected to represent either polarity bit of a binary code, for purposes of illustration, and without inference or intention of a limitation thereto, it will be assumed that the "1" stable state has been selected to correspond to the "mark" polarity bits and the "0" stable state to the "space" polarity bits of the binary coded decimal code.

So that the signal pulse representations appearing upon the several output terminals 1 through 9, inclusive, of signal source 10 may reproduce the binary coded decimal representation of the same digit in the first group of cores, there is provided a coupling circuit which interconnects each individual output terminal of the signal course 10 with those of the magnetic cores which correspond to the bit positions occupied by the same polarity bits within the binary coded decimal representation of the character to which each respective output terminal corresponds. For purposes of illustration only, and without intention or inference of a limitation thereto, it will be assumed that the coupling circuits from each of the output terminals 1 through 9, inclusive, of signal source 10 will be coupled to those magnetic cores which correspond to the bit positions occupied by the "mark" polarity bits in a polarity sense for producing therein the "1" stable state upon energization by the signal pulses. That is, the coupling circuit from output circuit terminal 1 is coupled to magnetic core 14 through coupling winding 15 and point-of-reference potential 16. Upon the energization of this coupling circuit by a signal pulse denoting the numerical digit 1 appearing upon output terminal 1 and assuming that each of cores 11 through 14 is in the "0" state, the "1" stable state will be produced in magnetic core 14 while cores 13, 12 and 11 will remain unaffected. The "1" stable state of magnetic core 14, corresponding to the first bit position within the binary coded decimal group, and the "0" stable state of magnetic cores 13, 11 and 12, corresponding to the second, third and fourth bit positions within the binary coded decimal group, is the binary coded decimal representation of the numerical digit 1 or "mark"-"space"-"space"-"space." Similarly, the occurrence of a signal pulse upon output terminal 7, for example, thereby denoting the presence of the numerical digit 7, will energize coupling coils 16 of core 14, 17 of core 13, and 18 of core 12, while core 11 remains unaffected. The "1" stable state in magnetic cores 14, 13 and 12, corresponding to the first, second and third bit positions within the binary coded decimal group, and the "0" stable state in core 11, corresponding to the fourth position within the binary coded decimal group, is the binary coded decimal representation for the numerical digit 7 or "mark"-"mark"-"mark"-"space." It should be pointed out at this time that should the right bit position, to which core 11 corresponds, be selected to be the least significant position and the left bit position, to which magnetic core 14 corresponds, be selected to be the most significant bit position, the connections from the signal source 10 would, of course, be reversed from those herein indicated. This is purely a design choice, and it is not intended or inferred that the operation of the present invention be limited to that as indicated in FIGURE 1.

A second group of binary elements, herein indicated as magnetic cores each composed of a magnetic material possessing substantially square hysteresis loop characteristics is indicated by reference numerals 19, 20, 21 and 22. Interconnecting each element of the first group with a respective element of the second group is a unidirectional transfer circuit network. This circuit has been shown in detail between core 11 of the first group and respective core 19 of the second group; however, since this transfer circuit is identical between the other cores of the first group and the respective cores of the second group, in the interest of reducing drawing complexity, it has been indicated therebetween by arrows. Through this transfer circuit, the stable state of the cores of the first group may be transferred to the respective cores of the second group in a manner to be later explained.

So that a transfer signal may be produced with each character, a nine input OR gate which, since the details form no part of this invention and are well known in the art, is illustrated in block form by reference numeral 23, is employed. Each output terminal of signal source 10 is connected to a respective one of the input terminals of nine input OR gate 23, as indicated, thereby resulting in an output signal therefrom upon the presence of a signal pulse in any one of the output terminals of signal source 10 in a manner well known in the art. This output pulse is applied to the input terminal of a conventional delay multivibrator which, since the details are well known in the art and form no part of this invention, is illustrated in block form by reference numeral 24. Delay multivibrators of this type are conventional in design and are arranged to have a normal state and an alternate state, produced upon the application of a trigger signal, in which state it remains for a duration of time designed into the circuit, upon the conclusion of which, it returns to the normal state. The signal emanating from OR gate 23 serves as a trigger signal to produce the alternate state in delay multivibrator 24, thereby producing a negative potential signal upon output terminal 25 thereof. This negative potential signal is the required transfer signal and is coupled to each of the magnetic cores of the first group through lead 26 and respective coupling windings 27, 28, 29 and 30. The sense of the coupling windings 27–30, inclusive, is such as to produce in each of the cores 11–14 the stable state opposite that produced by the coupling circuits from the output terminals of signal source 10. As the coupling circuits from signal source 10 have been assumed to produce the "1" stable state in the magnetic cores to which they are coupled, coupling windings 27–30 are poled in such a manner as to produce the "0" stable state in each of magnetic cores 11–14, upon being energized by the transfer signal present upon output terminal 25 of delay multivibrator 24. At the conclusion of the period of time designed into the circuit of delay multivibrator 24, delay multivibrator 24 reverts to its normal state, thereby removing the transfer signal from output terminal 25. Upon the occurrence of the transfer signal, therefore, all of the magnetic members 11–14, inclusive, which are in the "1" stable state, thereby denoting the "mark" polarity bits, will have their stable state reversed, in a manner well known in the art, thereby producing an output signal which is transferred to the respective magnetic core of the second group through the transfer circuitry hereinbefore described. These output signals are applied to the respective magnetic cores of the second group in a polarity sense for producing therein the stable state selected to denote the "mark" polarity bits, in this instance the "1" stable state. In this manner, therefore, the binary coded decimal representations stored in the first group of magnetic cores 11–14 may be transferred in parallel to respective cores of the second group 19–22, inclusive, in response to the transfer signals. So that the binary code representation which is now contained in the second group of magnetic cores 19–22, inclusive, may be removed therefrom in series, it is required that a source of shift pulses be provided. As practically all binary systems have a master oscillator clock which times the entire system, these clock pulses may be employed as the shift pulses and, for purposes of illustrating the novel device of this invention, this will be assumed to be the source. These clock pulses may be taken off terminal 31 of signal source 10 and applied through lead 32 to a respective input terminal of a conventional two input AND gate which, since the details are well known in the art and form no part of this invention, is illustrated in block form by reference numeral 33. The transfer signal present upon output terminal 25 of delay multivibrator 24 is also applied to the input terminal of a second delay multivibrator 34 of the same type as delay multivibrator 24. The transfer signal serves as a trigger pulse to delay multivibrator 34, thereby triggering it to its alternate state, with the resultant production of an output signal upon output terminal 35 thereof. This output signal is applied to the other input terminal of AND gate 33, thereby enabling AND gate 33 and providing for the passage therethrough of the shift pulses produced by the master clock which are applied to the magnetic cores 19–22 of the second group through respective coupling windings 36, 37, 38 an 36. The period of time which delay multivibrator 34 is in the alternate state should be of sufficient duration to provide for the conduction through AND gate 33 a sufficient number of shift pulses to clear cores 19–22, inclusive, in this instance four pulses. The sense of these coupling windings is such as to produce the stable state opposite that produced by the transfer circuits, in this instance the "0" stable state.

Interconnecting adjacent ones of the magnetic cores of the second group is a second unidirectional coupling circuit similar to that interconnecting the magnetic cores 11–14 of the first group with respective magnetic cores 19–22 of the second group and shown in detail between cores 19 and 20. As this coupling circuitry is identical in every respect, in the interest of reducing drawing complexity, it has been illustrated as arrows between cores 20 and 21 and cores 21 and 22. As the shift pulses are applied to the several shift windings 36–39, inclusive, the stable state of each of the cores of the second group, 19–22, inclusive, is successively stepped to the next succeeding core. Therefore, the serial binary code may be taken off magnetic core 22 through coupling winding 40, in which an output signal is produced with each reversal of state of magnetic core 22 and the serial binary code thereby produced may be removed from output terminal 41 and applied to external equipment, not shown. As an output signal is produced with each reversal of state of core 22, a diode 42 is inserted between output coupling winding 40 and output terminal 41 to prevent the appearance of an output signal upon output terminal 41 as magnetic core 22 is reversed from the "0" to the "1" stable state.

While a preferred embodiment of the present invention has been herein shown and described, it will be obvious to those skilled in the art that various modifications and substitutions may be made without departing from the spirit of the invention which is to be limited only within the scope of the appended claims.

What is claimed is:

1. A converter device comprising a signal source having a predetermined number of separate output terminals for intermittently applying a potential marking to any single one of said output terminals, first and second groups of corresponding bistable elements, each of said bistable elements having first and second stable conditions, means for coupling each of said output terminals to a unique combination of bistable elements of said first group for switching those bistable elements to which any particular output terminal is coupled from said first to said second stable condition thereof in response to the presence of said potential marking on said particular output terminal, first delay means coupled to said output terminals for producing a first control pulse in response to the removal of said potential marking from any of said output terminals, a first transfer means intercoupling each bistable element of said first group with its corresponding bistable element of said second group, means for applying said first control pulse to each of said bistable elements of said first group to switch those bistable elements of said first group which have been switched to their second stable condition back to their first stable condition and through said first transfer means switch each bistable element of said second group which corresponds to a switched-back bistable element of said first group from its first to its second stable condition, second transfer means intercoupling adjacent bistable elements of said second group, a source of shift pulses, second delay means coupled to said first delay means for producing a second control pulse in response to the lagging edge of said first control pulse being applied thereto, output means coupled to a terminal one of said bistable elements of said second group for deriving a pulse in response to said terminal one of said bistable elements being switched back from its second to its first stable condition, means coupled to said second delay means and said source of shift pulses for applying shift pulses to each of said bistable elements of said second group only during the presence of said second control pulse to cause each bistable element of said second group which has been switched from its first to second stable condition to switch back to its first stable condition, said second transfer means being responsive to a bistable element of said second group being switched back to its first stable condition for immediately thereafter switching that adjacent bistable element of said second group which is closer to said terminal one of said bistable elements from its first to its second stable condition, whereby serial time position pulses corresponding to said unique combination are derived in said output means.

2. The converter device defined in claim 1, wherein each of said first and second delay means is a delay multivibrator.

3. The converter device defined in claim 1, wherein each of said bistable elements is a magnetic core having a substantially square hysteresis loop characteristic.

References Cited in the file of this patent

UNITED STATES PATENTS

| | | |
|---|---|---|
| 2,825,890 | Ridler et al. | Mar. 4, 1958 |
| 2,846,671 | Yetter | Aug. 5, 1958 |